(12) United States Patent
Cheng

(10) Patent No.: US 10,409,874 B2
(45) Date of Patent: Sep. 10, 2019

(54) SEARCH BASED ON COMBINING USER RELATIONSHIP DATAUSER RELATIONSHIP DATA

(71) Applicant: Alibaba Group Holding Limited, Grand Cayman (KY)

(72) Inventor: Weihong Cheng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 424 days.

(21) Appl. No.: 14/740,938

(22) Filed: Jun. 16, 2015

(65) Prior Publication Data

US 2015/0363499 A1 Dec. 17, 2015

(30) Foreign Application Priority Data

Jun. 17, 2014 (CN) .......................... 2014 1 0270203

(51) Int. Cl.
*G06F 16/9535* (2019.01)
(52) U.S. Cl.
CPC .............................. *G06F 16/9535* (2019.01)
(58) Field of Classification Search
USPC ........................................ 707/722, 728, 724
See application file for complete search history.

(56) References Cited

U.S. PATENT DOCUMENTS

| | | | |
|---|---|---|---|
| 7,769,752 B1 * | 8/2010 | Turner .............. | G06F 17/30873 707/705 |
| 8,090,621 B1 * | 1/2012 | Chakrabarti ....... | G06Q 30/0601 705/26.1 |
| 8,386,469 B2 * | 2/2013 | Reuther .............. | G06F 16/2452 707/715 |
| 8,489,586 B2 * | 7/2013 | Korte ................ | G06F 17/30867 707/724 |

(Continued)

FOREIGN PATENT DOCUMENTS

CN 103838856 A 6/2014
EP 2720156 A1 4/2014

(Continued)

OTHER PUBLICATIONS

PCT Search Report and Written Opinion dated Oct. 23, 2015 for PCT Application No. PCT/US15/36028, 13 pages.

(Continued)

*Primary Examiner* — Cam Linh T Nguyen
(74) *Attorney, Agent, or Firm* — Lee & Hayes, P.C.

(57) ABSTRACT

A search request including user information and query information sent by a user is received. A search is conducted according to the query information to acquire a first search result associated with the query information. User relationship data associated with the user information is acquired. A second search result associated with both the query information and the user relationship data is acquired. A display order for various search result items in the first search result and the second search result is set. The first search result and (Continued)

the second search result are sent to the user after the display order is set. The techniques of the present disclosure provide abundant personalized search data for users, and meanwhile avoid poor user experience caused by excessive personalization.

20 Claims, 9 Drawing Sheets

(56) References Cited

U.S. PATENT DOCUMENTS

| | | | |
|---|---|---|---|
| 8,751,530 B1* | 6/2014 | Ioffe | G06F 17/30277 707/772 |
| 8,880,520 B2* | 11/2014 | Gulik | G06F 16/9535 707/732 |
| 9,978,022 B2* | 5/2018 | Tseng | G06Q 30/0261 |
| 2005/0044076 A1 | 2/2005 | Wu et al. | |
| 2007/0050393 A1* | 3/2007 | Vogel | G06F 16/367 |
| 2009/0024605 A1* | 1/2009 | Yang | G06F 17/30867 |
| 2009/0187537 A1* | 7/2009 | Yachin | G06F 17/30864 |
| 2009/0254546 A1 | 10/2009 | Madhavan | |
| 2009/0282022 A1* | 11/2009 | Bennett | G06F 17/30675 |
| 2010/0153215 A1* | 6/2010 | Abraham | G06Q 30/02 705/14.55 |
| 2010/0268661 A1* | 10/2010 | Levy | G06Q 30/02 705/347 |
| 2010/0306249 A1* | 12/2010 | Hill | G06F 17/30867 707/769 |
| 2010/0318425 A1* | 12/2010 | Karanjia | G06Q 30/02 705/14.66 |
| 2011/0010366 A1 | 1/2011 | Varshavsky et al. | |
| 2011/0040741 A1 | 2/2011 | Korte et al. | |
| 2011/0191318 A1 | 8/2011 | Gilbey et al. | |
| 2011/0258173 A1 | 10/2011 | Ratiner et al. | |
| 2011/0320441 A1 | 12/2011 | Lee et al. | |
| 2012/0066202 A1* | 3/2012 | Hatazawa | G06F 16/951 707/710 |
| 2012/0158713 A1* | 6/2012 | Jin | G06F 17/30029 707/728 |
| 2012/0158765 A1 | 6/2012 | Kumar et al. | |
| 2012/0185486 A1* | 7/2012 | Voigt | H04L 51/32 707/741 |
| 2013/0054587 A1* | 2/2013 | Ahari | G06F 17/30867 707/728 |
| 2013/0060744 A1* | 3/2013 | Roychoudhuri | G06F 17/30867 707/706 |
| 2013/0073546 A1* | 3/2013 | Yan | G06F 17/30867 707/732 |
| 2013/0097162 A1* | 4/2013 | Corcoran | G06F 16/29 707/724 |
| 2013/0110827 A1 | 5/2013 | Nabar et al. | |
| 2013/0124536 A1* | 5/2013 | Miyahara | G06F 17/30867 707/748 |
| 2013/0204940 A1* | 8/2013 | Kinsel | G06Q 30/02 709/204 |
| 2013/0212081 A1 | 8/2013 | Shenoy et al. | |
| 2013/0246415 A1* | 9/2013 | Davis | G06F 16/337 707/732 |
| 2013/0268511 A1 | 10/2013 | Bailey et al. | |
| 2013/0282706 A1 | 10/2013 | Yoo | |
| 2014/0188899 A1* | 7/2014 | Whitnah | G06Q 10/10 707/749 |
| 2014/0250101 A1* | 9/2014 | Wable | G06F 17/30631 707/711 |
| 2015/0269156 A1* | 9/2015 | Awadallah | G06F 17/3053 707/732 |
| 2015/0317314 A1* | 11/2015 | Venkataraman | G06F 17/3053 707/750 |

FOREIGN PATENT DOCUMENTS

| | | |
|---|---|---|
| JP | 2001101189 A | 4/2001 |
| RU | 124014 U1 | 1/2013 |
| WO | WO2006137271 A1 | 12/2006 |
| WO | WO2013046838 A1 | 3/2015 |

OTHER PUBLICATIONS

Chinese Office Action dated Mar. 21, 2018 for Chinese patent application No. 201410270203.2, a counterpart foreign application of U.S. Appl. No. 14/740,938, 14 pages.

Chinese Office Action and Search report dated Mar. 21, 2018 for Chinese patent application No. 201410270203.2, a counterpart of U.S. Appl. No. 14/740,938, 14 pages.

Russian Office Action dated Jan. 28, 2019 for Russian patent application No. 2017101241, a counterpart foreign application of U.S. Appl. No. 14/740,938, 16 pages.

Chinese Office Action dated Sep. 29, 2018, for Chinese patent application No. 201410270203.2, a counterpart foreign application of U.S. Appl. No. 14/740,938, 11 pages.

Chinese Office Action dated Sep. 20, 2018, for Chinese patent application No. 201410270203.2, a counterpart foreign application of U.S. Appl. No. 14/740,938, 1 page.

Japanese Office Action dated Mar. 12, 2019 for Japanese Patent Application No. 2016-573128, a counterpart of U.S. Appl. No. 14/740,938, 10 pages.

* cited by examiner

SEARCH BASED ON COMBINING USER RELATIONSHIP DATAUSER RELATIONSHIP DATA

CROSS-REFERENCE TO RELATED PATENT APPLICATION

This application claims foreign priority to Chinese Patent Application No. 201410270203.2 filed on 17 Jun. 2014, entitled "Search Method, Apparatus and System Based on Combining User relationship data", which is hereby incorporated by reference in its entirety.

TECHNICAL FIELD

The present disclosure relates to data search technology, and, more particularly, to a search method and apparatus for combining user relationship data. The present disclosure further provides a personalized search method and apparatus based on user relationship data, a method and apparatus for displaying search results, and a search system for combining user relationship data.

BACKGROUND

With the rapid development of the Internet, there is an explosive growth of network information. In order to acquire desirable information quickly, users usually use a search engine. The search engine is a system configured to collect information from the Internet by using specific computer programs according to a certain strategy, and, after the information organization and processing, to provide the users with a retrieval service to display relevant user retrieval information to the users.

In recent years, with a sudden rise of social network site (SNS), a large number of user generated content (UGC) has been produced. Users may select desirable information and the range of interests more accurately. Such sites include Facebook™, Weibo™, WeChat™, etc. In this case, how to influence the search results based on a user's personalization factors and display the personalized search results to the user is becoming increasingly important. The so-called personalized search results refer to search results that combine users' personalization factors, such as gender, age, preference, browsing habit and so on, which may also be construed as follows: since each user is different, even if different users use the same query information, they still acquire different search results.

In order to provide personalized search results to the users, in the prior art, some search engines provide completely personalized search services, for example, GraphSearch of Facebook™. The search engine allows the users to search specified related information such as: my friends in Beijing, my friends' favorite movies, etc., which is a completely personalized search engine whose search results will be personalized even though the users desire a universal search. The users may be unable to acquire information really needed due to the excessive personalization, which may affect users' browsing experience to some extent.

In order to avoid excessive personalization, some search engines may provide search services of combining universal search and personalized search. For example, the user's personal information is used as one of the reference factors for screening or ranking universal search results. However, since the personal information provided by users, such as gender, age, personal preference and other simple information, is often limited, the acquired personalized search results may be insufficient and cannot satisfy the users' need for personalized search.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a search method and apparatus for combining user relationship data to solve the technical problem of insufficient and inadequate personalized search results in the existing search techniques. The present disclosure further provides a personalized search method and apparatus based on user relationship data, a method and apparatus for displaying search results, and a search system for combining user relationship data.

The present disclosure provides a search method for combining user relationship data, including receiving a search request including user information and query information sent by a user; conducting a search according to the query information to acquire a first search result associated with the query information; acquiring user relationship data associated with the user information; acquiring a second search result associated with both the query information and the user relationship data; setting a display order for various search result items in the first search result and the second search result according to a preset rule; and sending the first search result and the second search result to the user after the display order is set.

Optionally, the acquiring the second search result associated with both the query information and the user relationship data includes conducting a search according to the query information and the user relationship data to acquire the second search result associated with both the query information and the user relationship data; or screening search result items associated with the user relationship data from the first search result, and using the screened search result items as the second search result.

Optionally, the user information includes user identification, or user identification and an IP address of a client terminal initiating the search request.

Optionally, after receiving a search request including user information and query information, the following operation, i.e., rewriting the query information to be more suitable for a search operation according to a preset rule, is executed first.

Optionally, before executing the operations of acquiring user relationship data and acquiring a first search result and acquiring a second search result, the following operation, i.e., selecting a search category corresponding to the query information, is executed.

Optionally, the acquiring user relationship data associated with the user information includes the following operations: selecting a category of relationship data associated with the search category; and acquiring user relationship data according to the user information and the category of relationship data.

Optionally, the acquiring user relationship data associated with the user information further includes screening the acquired user relationship data according to the search category.

Optionally, the operations of acquiring a second search result associated with both the query information and the user relationship data refer to conducting a search according to the query information and the user relationship data to acquire a second search result associated with both the query information and the user relationship data. The operations of conducting a search according to the query information and the user relationship data to acquire a second search result associated with both the query information and the user relationship data specifically refer to acquiring the second search result by searching data associated with the search category from an index database according to the query information and the user relationship data.

Optionally, the acquiring a second search result associated with both the query information and the user relationship data further includes the following operations: scoring each search result item in the acquired second search result according to a preset recommendation model, and ranking the second search result according to the scores from high to low.

Optionally, the preset recommendation model may include a classified machine learning model which includes a Logistic Regression Model or a Gradient Boosting Decision Tree (GBDT) Model.

Optionally, the acquiring a second search result associated with both the query information and the user relationship data further includes, with respect to each search result item whose score meets a set requirement, writing into a respective search result item a relationship data category corresponding thereto as a recommendation reason for the respective search result item.

Optionally, the sending the first search result and the second search result to the user after the display order is set includes the following operations: annotating to-be-displayed texts or pictures of a search result item including the recommendation reason in the second search result with the recommendation reason; and sending the first search result and the second search result to the user after the annotation.

Optionally, the conducting a search according to the query information to acquire a first search result associated with the query information includes sending a request for acquiring a first search result to a server that provides the first search result; and receiving the first search result associated with the query information and returned by the server. The request includes the query information.

Optionally, the acquiring user relationship data associated with the user information includes the following operations: sending a request for acquiring user relationship data to a server that provides the user relationship data, and receiving the user relationship data associated with the user information and returned by the server. The request includes at least the user information.

Optionally, the acquiring a second search result associated with both the query information and the user relationship data includes the following operations: sending a request for acquiring a second search result to a server that provides the second search result; and receiving the second search result associated with both the query information and the user relationship data and returned by the server. The request includes at least the user relationship data.

Correspondingly, the present disclosure further provides a search apparatus for combining user relationship data. The search apparatus may include the following units.

A search request receiving unit receives a search request including user information and query information sent by a user. A first search result acquiring unit conducts a search according to the query information to acquire a first search result associated with the query information. A relationship data acquiring unit acquires user relationship data associated with the user information. A second search result acquiring unit acquires a second search result associated with both the query information and the user relationship data. A display order setting unit sets a display order for various search result items in the first search result and the second search result according to a preset rule. A search result sending unit sends the first search result and the second search result to the user after the display order is set.

Optionally, the second search result acquiring unit may include a search acquiring sub-unit or a screening acquiring sub-unit.

The search acquiring sub-unit conducts a search according to the query information and the user relationship data to acquire a second search result associated with both the query information and the user relationship data. The screening acquiring sub-unit screens search result items associated with the user relationship data from the first search result, and uses the screened search result items as the second search result.

Optionally, user information in a search request received by the search request receiving unit includes user identification or user identification and an IP address of a client terminal initiating the search request.

Optionally, the apparatus may further include a search request pre-processing unit that rewrites the query information to be more suitable for a search operation according to a set rule.

Optionally, the apparatus may further include a search category selecting unit that selects a search category corresponding to the query information before executing the operations of acquiring user relationship data and acquiring a first search result and acquiring a second search result.

Optionally, the relationship data acquiring unit may include the following sub-units. A category selecting sub-unit selects a category of relationship data associated with the search category. An acquisition executing sub-unit acquires user relationship data according to the user information and the category of relationship data.

Optionally, the relationship data acquiring unit may further include a data screening sub-unit that screens the acquired user relationship data according to the search category/

Optionally, when the second search result acquiring unit includes the search result acquisition sub-unit, the search acquiring sub-unit searches data associated with the search category from an index database according to the query information and the user relationship data to acquire the second search result.

Optionally, the second search result acquiring unit may further include a search result ranking sub-unit that scores each search result item in the acquired second search result according to a preset recommendation model and ranks the second search result according to the scores from high to low.

Optionally, the second search result acquiring unit may further include a recommendation reason recording sub-unit that, with respect to each search result item whose score meets a set requirement, write into a respective search result item a corresponding relationship data category as a recommendation reason for the respective search result item.

Optionally, the search result sending unit may include the following sub-units.

A recommendation reason annotating sub-unit annotates a to-be-displayed text or picture of a search result item including the recommendation reason in the second search result with the recommendation reason. A result sending executing sub-unit sends the first search result and the second search result to the user after the annotation.

Optionally, the first search result acquiring unit may include the following sub-units.

A first search request sending sub-unit sends a request for acquiring a first search result to a server that provides the first search result. The request includes the query information.

A first search result receiving sub-unit receives the first search result associated with the query information and returned by the server.

Optionally, the relationship data acquiring unit may include the following sub-units.

A data acquisition request sending sub-unit sends a request for acquiring user relationship data to a server that provides the user relationship data. The request includes at least the user information.

A relationship data receiving sub-unit receives the user relationship data associated with the user information and returned by the server.

Optionally, the second search result acquiring unit may include the following sub-units.

A second search request sending sub-unit sends a request for acquiring a second search result to a server that provides the second search result. The request includes at least the user relationship data.

A second search result receiving sub-unit receives the second search result associated with both the query information and the user relationship data and returned by the server.

Correspondingly, the present application further provides a search system for combining user relationship data, which includes any search apparatus for combining user relationship data as described above and a client terminal device that sends a user search request.

In addition, the present application further provides a personalized search method based on user relationship data, which may include the following operations: receiving a search request including user information and query information; acquiring user relationship data associated with the user information; acquiring a search result associated with both the query information and the user relationship data, the result being referred to as a personalized search result; and sending the personalized search result to an initiator who initiates the search request.

Optionally, the acquiring a personalized search result associated with both the query information and the user relationship data includes the following operations: conducting a search according to the query information to acquire a first search result associated with the query information; and screening search result items associated with the user relationship data from the first search result, and using the screened search result items as the personalized search result.

Optionally, the acquiring a personalized search result associated with both the query information and the user relationship data refers to conducting a search according to the query information and the user relationship data to acquire a personalized search result associated with both the query information and the user relationship data.

Optionally, the user information includes user identification, or user identification and an IP address of a client terminal initiating the search request.

Optionally, after receiving a search request including user information and query information, the following operation is executed first, i.e., rewriting the query information to be more suitable for a search operation according to a set rule.

Optionally, before executing the operations of acquiring user relationship data and acquiring a personalized search result, the following operation is executed, i.e., selecting a search category corresponding to the query information.

Optionally, the acquiring user relationship data associated with the user information includes selecting a category of relationship data associated with the search category and acquiring user relationship data according to the user information and the category of relationship data.

Optionally, the acquiring user relationship data associated with the user information further includes screening the acquired user relationship data according to the search category.

Optionally, when the acquiring a personalized search result associated with both the query information and the user relationship data refers to conducting a search according to the query information and the user relationship data to acquire a personalized search result associated with both the query information and the user relationship data, the conducting a search according to the query information and the user relationship data to acquire a personalized search result associated with both the query information and the user relationship data specifically refers to acquiring the personalized search result by searching data associated with the search category from an index database according to the query information and the user relationship data.

Optionally, the acquiring a personalized search result associated with both the query information and the user relationship data further includes scoring each search result item in the acquired personalized search result according to a preset recommendation model, and ranking the personalized search result according to the scores from high to low.

Optionally, the acquiring a personalized search result associated with both the query information and the user relationship data further includes, with respect to each search result item whose score meets a set requirement, writing into a respective search result item a corresponding relationship data category of the respective search result item as a recommendation reason for the respective search result item.

Optionally, the sending the personalized search result to an initiator who initiates the search request includes annotating a to-be-displayed text or picture of a search result item including the recommendation reason with the recommendation reason and sending the personalized search result to the initiator who initiates the search request after the annotation.

Optionally, the acquiring user relationship data associated with the user information includes sending a request for acquiring user relationship data to a server that provides the user relationship data and receiving the user relationship data associated with the user information and returned by the server. The request includes at least the user information.

Optionally, the acquiring a personalized search result associated with both the query information and the user relationship data includes sending a request for acquiring a personalized search result to a server that provides the personalized search result and receiving the personalized search result associated with both the query information and the user relationship data and returned by the server. The request includes the query information and the user relationship data.

Correspondingly, the present application further provides a personalized search apparatus based on user relationship data, which includes the following units.

A personalized search request receiving unit receives a search request including user information and query information. A personalized relationship data acquiring unit acquires user relationship data associated with the user information. A personalized search result acquiring unit acquires a search result associated with both the query information and the user relationship data. Such result is referred to as a personalized search result. A personalized search result sending unit sends the personalized search result to an initiator that initiates the search request.

Optionally, the personalized search result acquiring unit may include the following sub-units.

A first search result acquiring sub-unit conducts a search according to the query information to acquire a first search result associated with the query information. A search result selecting sub-unit selects search result items associated with the user relationship data from the first search result and uses the selected search result items as the personalized search result.

Optionally, the personalized search result acquiring unit may include the following sub-units.

A personalized search executing sub-unit conducts the search according to the query information and the user relationship data to obtain the individualized search result that is associated with both the query information and the user relationship data.

Optionally, the user information in a search request received by the search request receiving unit includes user identification, or user identification and an IP address of a client terminal initiating the search request.

Optionally, the apparatus may further include a search request pre-processing unit that rewrites the query information to be more suitable for a search operation according to a preset rule.

Optionally, the apparatus may further include a search category selecting unit that selects a search category corresponding to the query information before executing the operations of acquiring user relationship data and acquiring the personalized search result.

Optionally, the personalized relationship data acquiring unit may include the following sub-units.

A category selecting sub-unit selects a category of relationship data associated with the search category. An acquisition executing sub-unit acquires user relationship data according to the user information and the category of relationship data.

Optionally, the personalized relationship data acquiring unit may also include a data screening sub-unit that screens the acquired user relationship data according to the search category.

Optionally, when the personalized search result acquiring unit includes the personalized search executing sub-unit, the personalized search executing sub-unit searches data associated with the search category from an index database according to the query information and the user relationship data to acquire the personalized search result.

Optionally, the personalized search result acquiring unit may include a search result ranking sub-unit that scores each search result item in the acquired personalized search result according to a preset recommendation model, and ranks the personalized search result according to the scores from high to low.

Optionally, the personalized search result acquiring unit may further include a recommendation reason recording sub-unit that, with respect to each search result item whose score meets a set requirement, writes into a respective search result item a relationship data category corresponding thereto as a recommendation reason for the respective search result item.

Optionally, the personalized search result sending unit may include the following sub-units. A recommendation reason annotation sub-unit annotates a to-be-displayed text or picture of a search result item including the recommendation reason with the recommendation reason. A personalized search result sending executing sub-unit sends the personalized search result to the initiator who initiates the search request after the annotation.

Optionally, the personalized relationship data acquiring unit may include the following sub-units.

A data acquisition request sending sub-unit sends a request for acquiring user relationship data to a server that provides the user relationship data. The request includes at least the user information.

A relationship data receiving sub-unit receives the user relationship data associated with the user information and returned by the server.

Optionally, the personalized search result acquiring unit may include the following units.

A personalized search request sending sub-unit sends a request for acquiring a personalized search result to a server that provides the personalized search result. The request includes the query information and the user relationship data.

A personalized search result receiving sub-unit receives the personalized search result associated with both the query information and the user relationship data and returned by the server.

In addition, the present disclosure further provides a method for displaying search results, which may include the following operations: acquiring a first search result and a second search result for a user search request, the first search result being a search result associated with query information included in the search request, the second search result being a personalized search result associated with both user personal information and query information included in the search request; and determining, for each search result item in the first search result and the second search result, whether the search result item includes recommendation information. If a result is positive, a to-be-displayed text or picture of the search result item is annotated with the recommendation information. The operations further include displaying the first search result and the second search result.

Optionally, the user personal information includes user relationship data.

Optionally, the recommendation information includes recommendation reason and/or a degree of association with the user.

Optionally, the displaying the first search result and the second search result includes sending the first search result and the second search result to the client terminal of the initiator who initiates the search request for display.

Correspondingly, the present disclosure further provides an apparatus for displaying search results, which may include the following units.

A search result acquiring unit acquires a first search result and a second search result for a user search request. The first search result is a search result associated with query information included in the search request. The second search result is a personalized search result associated with both user personal information and query information included in the search request.

A recommendation information annotating unit determines, for each search result item in the first search result and the second search result, whether the search result item includes recommendation information, and if a result is positive, annotates a to-be-displayed text or picture of the search result item with the recommendation information.

A search result displaying unit displays the first search result and the second search result.

Optionally, the second search result acquired by the search result acquiring unit is the personalized search result associated with both user relationship data and query information included in the search request.

Optionally, the recommendation information annotated by the recommendation information annotating unit includes a recommendation reason and/or a degree of association with the user.

Optionally, the search result displaying unit sends the first search result and the second search result to the client terminal of the initiator who initiates the search request for display.

Compared with the prior art, the present disclosure has at least following technical advantages.

The search method for combining user relationship data provided in the present disclosure, by acquiring a first search result associated with the query information, acquires a second search result associated with both the query information and the user relationship data, and combines the first search result and the second search result according to a set strategy and returns to the user who initiates a search request, thereby providing more abundant personalized search data to the user and meanwhile avoiding poor user experience caused by excessive personalization.

The personalized search method based on user relationship data provided in the present disclosure, by acquiring user relationship data and by obtaining personalized search result associated with the user relationship data, provides more abundant personalized search result to the user who initiates a search request.

The method for displaying search results provided in the present application, by annotating to-be-displayed texts or pictures of a personalized search result item with recommendation information corresponding to the search result item and by displaying the personalized search result to a user, enables the user to perceive the source of the search result clearly, thereby reducing the cost of information screening by the user and helping the user make a quick and correct decision.

DETAILED DESCRIPTION

Specific details are illustrated in the following descriptions to fully understand the present disclosure. However, the present disclosure may be implemented in multiple other embodiments different from the descriptions herein, and modifications may be made by those skilled in the art without departing from the spirit of the present disclosure. Therefore, the present disclosure is not limited to the concrete implementation as disclosed below.

The present disclosure provides an example search method and apparatus for combining user relationship data, an example personalized search method and apparatus based on user relationship data, an example method and apparatus for displaying search results, and an example search system for combining user relationship data, which will be described respectively in the following example embodiments.

Figure 1:
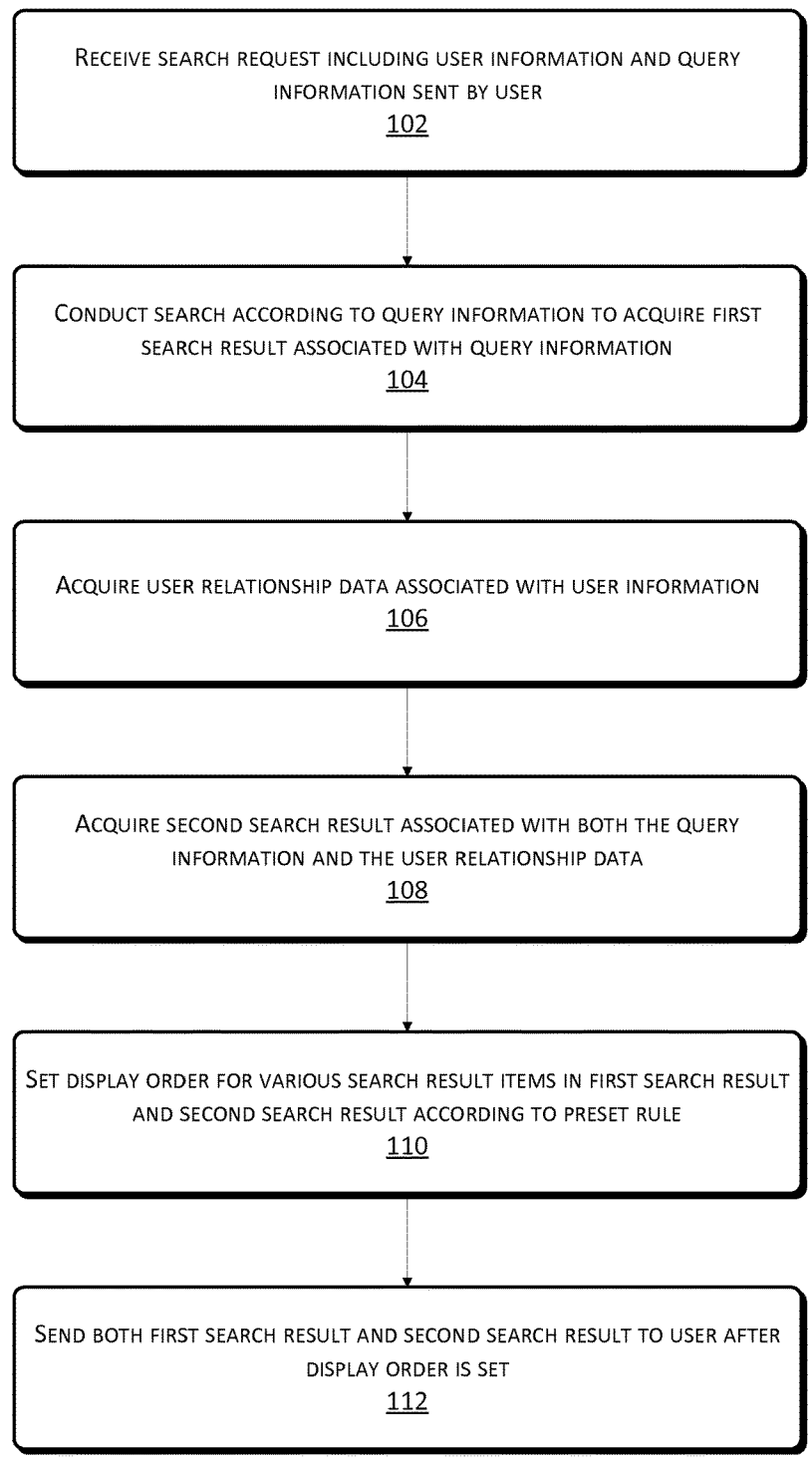
FIG. 1 is a flowchart of an example search method for combining user relationship data according to the present disclosure.

Referring to FIG. 1, which is a flowchart of an example search method for combining user relationship data according to the present disclosure. The method may include the following operations.

At 102, a search request including user information and query information sent by a user is received.

In order to query for desirable information, users usually input information for query, i.e., commonly referred to as search keyword, into a search box in a client terminal search interface, and then send a search request to a server providing search services. The server providing search services will receive the corresponding search request. The received search request may include query information provided by the user and user information.

The user information as described in the present disclosure includes a user identification that identifies a user identity and other information related to the user. The user identification may be a user ID that uniquely identifies the user identity such as a user account number for logging into a client terminal of Taobao™. According to the user ID, it is possible to know who the current user is and acquire relationship data related to the user (for the relevant description, please refer to the corresponding part in 106). In some cases, a user may initiate a search request directly without executing a login operation. In such case, the user ID number in a cookie may be used as a temporary user identity. According to the user ID in a cookie, it is also possible to acquire some relationship data related to the user's recent browse behaviors. In addition, user information may further carry other user information provided by the client terminal, for example, an IP address of the client terminal where the user initiates the search request. According to such information, a user's geographical location information may be determined, from which some relationship data related to the user may also be acquired (refer to the description at 106).

After receiving a search request, the query information may be pre-processed first, i.e.: the query information is rewritten to be more suitable for a search operation according to a preset rule. The rewriting operation may include: replacing part of characters or words in query information, or deleting unnecessary characters or words in query information, for example, deleting "of" in "Nike of red," and then rewriting "Nike of red" into "red Nike or red 耐克 (Nike in Chinese character)." The pre-processing of the query information makes the query information more suitable for subsequent search operation, which facilitates the recall of the search results and may improve correctness and effectiveness of search results.

When the search request is received for a search processing, a search category corresponding to the query information may be selected. The reason that the search category is selected is as follows.

Generally, a search process refers to a process of collecting information from the Internet by using specific computer programs according to a certain strategy, and screening, organizing, and ranking the information, and finally returning the processed information to users who initiate a search request. Normally, since there will be massive data in a search process, in order to improve the search efficiency, each search engine often organizes searched data by using inverted index, i.e., a structure that uses keywords of a searched document as an index and uses a document or a document mark number as an index target, which is also referred to as an index base or index database).

With the development of the Internet, there is an increasing number of information, resulting in the index database growing larger. In order to further improve the search efficiency, a certain strategy may be adopted to define a plurality of search categories, and to set a search category for each searched destination document, and the data in the index database may be organized according to the search categories. Thus, in the case of online search, the data needed by users is recalled immediately by searching the index entry related to the category, instead of searching the whole index database. Since the search scope is narrowed, the search performance gets improved.

In order to improve the search efficiency as indicated above and meanwhile specify the relationship data category according to the search category in the subsequent operations at 106, the technical solution of the embodiments of the present disclosure may select a search category corresponding to the query information before acquiring the user relationship data and conducting a search. For example, when the user's query information includes "T-shirt", according to the preset rule, the techniques of the present disclosure may predict that the information searched by the user is related to several search categories such as "men T-shirt," "women T-shirt," "children T-shirt," etc. Examples provided herein are merely exemplary, and in a specific implementation, different search categories may be set, and the corresponding relationship between query information and search category may be specified according to actual demand, which is not the core of the present disclosure and thus is not limited by the present disclosure.

With respect to the technical solution of the present disclosure, the operation of pre-processing the query information is not necessary, and the operation of selecting a search category corresponding to the query information is not essential either. Without the above two operations, the technical solution of the present disclosure may still be implemented by executing subsequent operations from 104 to 112 directly.

At 104, a search is conducted according to the query information to acquire a first search result associated with the query information.

The first search result described in the present disclosure is a commonly known universal search result. The so-called universal search refers to searching for search entries in an index database according to user's query information to acquire universal search results associated with the query information. If search categories are predicted at 102, the universal search may only search index entries related to the search categories in the index database. The universal search is a conventional technique and will not be described herein.

It should be noted that the operation of acquiring universal search results may also be implemented by accessing a server that provides universal search results. In this case, the step includes two parts: sending a request and receiving a reply, or more specifically, sending a request for acquiring universal search results to the server that provides universal search results, the request including the query information; and receiving the universal search results associated with the query information and returned by the server.

At 106, user relationship data associated with the user information is acquired.

A technical solution provided in the example embodiment of the present disclosure, when providing search services to the user, may search a first search result (also referred to as the universal search result) associated with the query information, and acquire a second search result (also referred to as a personalized search result, and please refer to the description at 108) by using the user relationship data, and combine both search results as the final search result. In this way, abundant personalized search data is provided to the user, and at the same time the user experience will not be affected by excessive personalization. The user relationship data includes data reflecting the relation between the user and other people, and the relation between the user and other objects. The data reflecting the relation between the user and other people is generally regarded as user's social relationship data, for example, bidirectional friend relationship data on the user's microblog and Alipay™ website, and unidirectional relationship data such as Taobao™ favorite person which the user follows. The data reflecting the relation between the user and other objects includes relationship data between the user and stores, such as stores where the user completed a purchase, stores that the user browsed, etc., as well as relationship data between the user and commodities, such as commodities that the user purchased, commodities that the user browsed, etc. Examples enumerated above are merely exemplary. The user relationship data described in the present disclosure are not limited to the above examples, and may be further mined and subdivided according to specific application scenarios.

In order to provide the users with a more abundant personalized search result, in addition to the data reflecting the relation between the user and other people and the relation between the user and other objects, the user relationship data in the present disclosure may further include a user's personal demographic data, such as user age, gender, territory, shopping preference, vehicle model and so on. For example, the IP address of the user's client terminal mentioned in 102 belongs to the user demographic data, according to the approximate geographical position where the user currently is located is determined and accordingly further acquire relevant user relationship data. For example, according to the IP address, the current position where the user is located is Beijing, and then the technical solution provided in the present disclosure acquires stores where the user in Beijing likes to do shopping or commodities the user in Beijing likes as the user relationship data.

The user relationship data in the present disclosure may be generated by online real-time update. For example, a certain Taobao™ user browses or purchases a commodity, the information may be recorded in the relationship data of the Taobao™ user. For another example, personal information filled in by a user actively during account registration or other operations may also be added to the user relationship data in real time. In addition, the user relationship data may also be implemented by accessing other system open interfaces to acquire various application data from other servers or systems, such as friendship relationship from microblog, etc. The user relationship data may be stored either in a storage system in key-value form, or a storage system with other organization modes, as long as the relationship data related to the particular user may be acquired.

The user relationship data may be pre-stored. When the user makes a search request, user relationship data corresponding to the user may be acquired according to the user information.

Figure 2:
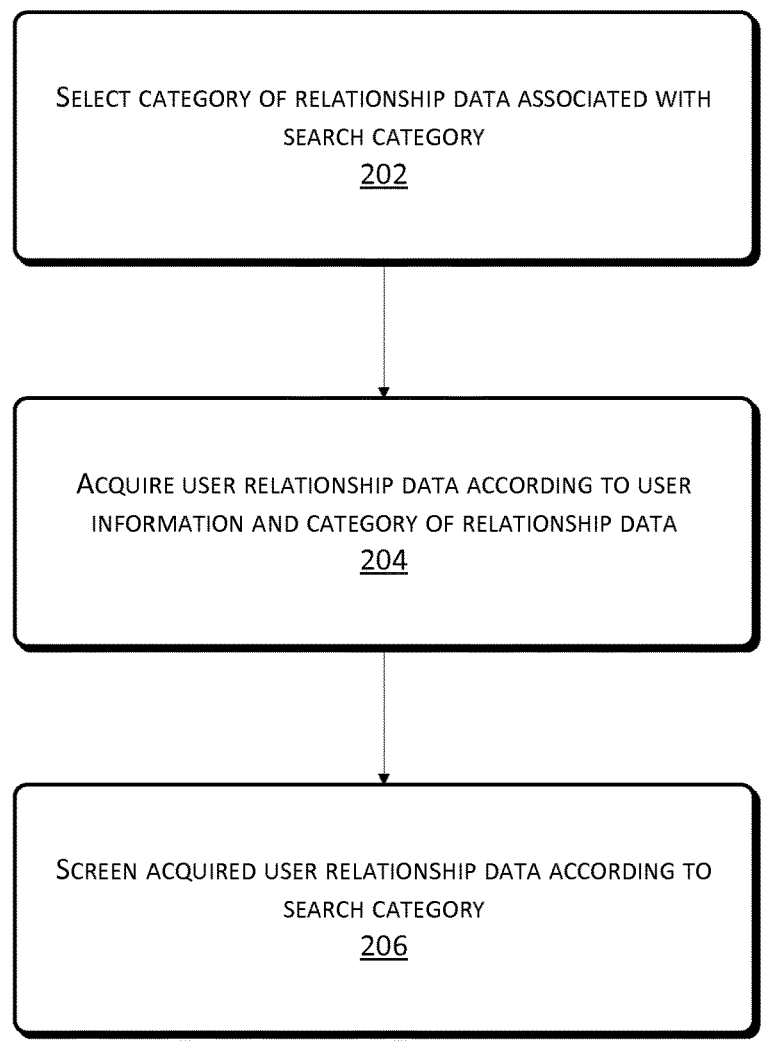
FIG. 2 is a flow chart of an example acquiring user relationship data based on a search request according to the present disclosure.

Please refer to FIG. 2, which is a processing flow chart of an example method for acquiring user relationship data based on a search request according to the present disclosure. The specific processing process of acquiring the user relationship data is described as below in combination with FIG. 2.

At 202, a category of relationship data associated with the search category is selected.

After the search category is determined at 102, the category of relationship data associated with the search category may be further determined. As seen in the introduction to the user relationship data above, generally the user relationship data may involve many aspects, different user relationship data may have different influences on different search requirements, and certain user relationship data may even have nothing to do with some search requests. In this case, in order to reduce the workload in extracting the user relationship data, the category of the relationship data associated with the search category may be designated in this step. For example, if the search category is "women dress," several relationship data such as "stores where users completed a purchase" and "brands users purchased" may be selected. If the search category is "fruit", several relationship data such as "stores where users completed a purchase" and "stores where people in the same city like to go shopping" may be selected in this step.

In a specific example, a correspondence rule between the search category and relationship data category may be summarized in advance according to expertise in the field and big data analysis results to establish a mapping relationship database such as "relationship search rule database." Each time when it is necessary to acquire user relationship data, the category of relationship data associated with the search category may be determined by querying for such rule database. In other implementations, the correspondence rule between the search category and relationship data category may also be established in other modes, and the correspondence rule may be stored by adopting other forms or data files instead of a database.

At 204, user relationship data is acquired according to the user information and the category of the relationship data.

According to the user information carried in the search request and the relationship data category selected at 202, the user relationship data corresponding to the current user is extracted from the stored user relationship data. In a specific example, nearly hundreds of billions of user relationship data is stored in a key-value storage system. By setting a desirable key, a corresponding value, i.e., specific user relationship data, may be acquired via an interface (such as through a program instruction like a get ( ) method under some computer languages) provided by the storage system. For example, if the user information carried in the search request is a user ID, and the relationship data category selected at 204 is "stores where users completed a purchase," the key will be set as "user ID+stores where users completed a purchase," and the information (e.g., store number and the like) about the stores where the users completed the purchase as indicated by "user ID" is acquired via the interface of the storage system. Above examples are merely exemplary. In a specific implementation process, based on the requirement on access to the adopted storage system, desirable user relationship data may be acquired by inputting the user information carried in the search request and the acquired relationship data category.

The above description describes the simplest method for acquiring user relationship data. In a specific implementation, user relationship data extracted in this step may be further extended, such that multiple relation transformations may be implemented by recursive query to acquire more abundant user relationship data. For example, in the specific examples described above, a friend, such as User A, of the user identified by the user ID is acquired firstly by using "user ID plus microblog friend" as a Key, and then information on stores where User A completed a purchase is acquired by using "User A plus stores where User A completed a purchase" as a key to acquire user relationship data such as "stores where a friend completed a purchase." In a similar way, the user relationship data such as "stores that a friend likes" and "favorite persons similar to those I like" and so on may be acquired, thereby further deeply mining the user relationship data.

In the above specific examples, on the basis of online service performance, merely the support for second-degree relation transformation is provided. In other implementations, under the premise of meeting requirements for online service performance, the techniques of the present disclosure may provide multi-degree relation transformation, thereby acquiring more abundant user relationship data.

At 206, the acquired user relationship data is screened according to the search category.

Since the user relationship data often covers a number of categories, in this step, the relationship data may be pre-screened according to the user's search category to reduce the amount of computation in the subsequent search. For example, the selected search category is "women dress," and the selected category of user relationship data is "stores where users completed a purchase." According to the category, Store A and Store B are acquired at 204. Since the Store A sells children's wear, which is different from the search category of the search, the user relationship data such as Store A may be removed when the acquired relationship data is screened according to the selected search category "women dress."

At this point, the user relationship data associated with the current search request is acquired. The category of the user relationship data may be determined according to a search category. The search category may be determined according to query information. Therefore, the user relationship data may be associated with both the user information and the query information.

If at 102 no search category corresponding to the query information is selected, at 106, it is unnecessary to execute the above operations at 202. That is, without selecting the category of user relationship data according to the search category, operations at 206 are executed directly, and the user relationship data are acquired only according to user information. In this way, more user relationship data (possibly including some user relationship data irrelevant to the search) may be acquired, but the technical solution of embodiments of the present disclosure may be achieved. Similarly, if no search category corresponding to the query information is selected at 102, the technical solution of the present disclosure may also be achieved without executing the screening operation of 206 at 102.

It should be noted that the forgoing step of acquiring user relationship data may also be completed by accessing the server that provides user relationship data. In this case, the operation includes two parts: sending a request and receiving a reply. Specifically, the operation includes sending a request for acquiring user relationship data to the server that provides user relationship data, the request including the query information and user search information (if the search category has been acquired, the request may carry user information and the search category directly); and receiving user relationship data associated with the user information and/or the query information and returned by the server.

At 108, a second search result associated with both the query information and the user relationship data is acquired.

The second search result in the present disclosure is commonly known as a personalized search result. The personalized search results refer to search results that combine users' personalized factors such as gender, age, hobby, browsing habit and so on. Users may feel that personalized search results are customized for themselves when facing the personalized search result, which may also be construed from another perspective: since each user is different, even if different users use the same query information, they still acquire different search results. In order to provide a user with personalized search results, the search engine generally may combine user personal information to execute a search operation or screen and rank the search results, etc.

As to a technical solution of the present disclosure, in order to provide the user with more abundant personalized search result, at 106, the user relationship data has been acquired according to the user information included in the search request, and the personalized search result to be provided to the user is further acquired in combination with the user relationship data at 108, which may include following two processes: 1) acquiring the personalized search result; and 2) ranking the personalized search result, each of which will be illustrated as below.

Acquire the personalized search result.

A technical solution of the present disclosure provides the following example methods for acquiring personalized search result.

Method I: personalized search result is acquired on the basis of the first search result. The first search result (i.e., universal search result) is acquired according to the query information in the previous operation at 104. The first search result may include search result associated with the user relationship data. Therefore, search result items associated with the user relationship data may be screened from the first search result, and the screened search result items may be used as the personalized search result.

In the example of searching commodities, the first search result, i.e., a commodity information list associated with the query information, has been acquired at 104, and the user relationship data acquired at 106 is Store A where users completed a purchase. Such data may be used to screen each search result item one by one in the first search result, such as checking if a seller of the commodity is Store A. If so, the current commodity and information thereof will be added into the personalized search result associated with user relationship data. All search result items screened in the above method constitute the personalized search result.

Method II: the personalized search result is acquired directly by searching. In terms of a universal search, generally index entries related to a search category in an index database will be searched according to the query information. In such a method, the user relationship data needs to be added into the search condition, i.e., index entries related to a search category in an index database will be searched according to the query information and user relationship data, which may be construed as follows. The query information used for executing a search operation in this step is similar to the following form: the query information provided by users and (relationship data 1 or relationship data 2 . . . ), thereby acquiring a personalized search result including the query information and associated with the user relationship data.

If at 102, no search category corresponding to the query information is selected, the search process in the method II is executed in the whole index database, and the search performance may be affected to some extent, but the personalized search result based on user relationship data is still be acquired.

The personalized search result (i.e., the second search result described in the present disclosure) associated with both the query information and the user relationship data may be acquired in both of the above two methods. In case of the following application scenario, if there is a larger number of first search results associated with the query information, in consideration of factors such as online service performance and so on, at 104 only part of the search results will be returned as the first search result and part of the search results associated with the user relationship data may be omitted. In such case, the foregoing method II may be adopted, i.e., executing a personalized search to acquire the relatively complete personalized search result.

For example, the personalized search result includes one or more search result items, each of which includes contents basically the same as those of search result items of a universal search result in the exiting technique. By using the search of a commodity as an example, each search result item generally includes a commodity ID, a commodity picture (or picture address), seller information, sales volume information, a product link, etc.

Rank the personalized search result.

As a simple implementation, after acquiring the first search result and the personalized search result, a display order may be set for search result items of both search results and then the search result items are sent to the user who initiates the search request. In order to provide a priority display of the most attractive personalized search result item to users and furthest improve user satisfaction on search results, the technical solution of the present disclosure further provides an implementation of ranking the personalized search result, which will be described as follows.

According to information among multiple dimensions such as a relation closeness degree between the user who initiates the search request and search results, an importance of the relationship data and so on, each search result item in the personalized search result is scored by using a preset recommendation model, which is used as a criterion for determining the attraction of a search result item to the user. The higher the score of a search result item is, the more attractive the search result item is to the user. In order to provide a priority display of the personalized search result items with higher scores to the user, the personalized search result may be ranked according to the scores from high to low, thereby acquiring the personalized search result to be returned to the user.

In terms of the recommendation model, various classified machine learning model may be used, for example, Logistic Regression Model or GBDT Regression Model, etc. By using whether the search result is clicked by the user as a target, the search result and user's massive features are extracted for training. By using the search of commodity as an example, massive features of the commodity and the users are extracted for training in advance, and a recommendation model, which accurately calculates the scores representing the attraction of the commodity to the users according to the relation closeness degree between the user and the commodity, the importance of relationship data, the commodity quality, etc., will be finally acquired. After acquiring a trained recommendation model, when the user conducts an online search, the recommendation model is used for scoring and ranking the personalized search result.

In addition, the technical solution of the present disclosure further provides an example implementation. With respect to each search result item whose score meets a set requirement, a relationship data category corresponding to the search result item is written into the search result item as a recommendation reason for the search result. The implementation is capable of providing support for the recommendation reason of displaying the search results to the user.

As described above, the score has been calculated for each search result item in the personalized search result. In order that the user clearly perceives the source of personalized search result items and in order to reduce the cost of information screening for the user, in this step, a relationship data category corresponding to a search result item whose score meets a set requirement may be written into the search result item. For example, a string of text information is added into a search result item, and the relationship data category corresponding to the search result item is recorded in the text information, e.g., stores where the user completed a purchase, commodities that the user browsed, etc. Due to the carried information, when the personalized search result is returned to the user, the user may acquire the source of the personalized search result, i.e., the recommendation reason of the personalized search result, and thus it is unnecessary to judge the correctness and effectiveness of the search result, thereby helping the user make quick and correct choice.

With respect to the search result item whose score meets a set requirement, a selection may be made by adopting different strategies according to implementation demand. For example, search result items whose scores are higher than a preset threshold value, or a number of top search result items such as top 50 search result items whose scores are ranked according to the scores from high to low, etc.

At this point, the personalized search result of the search request is acquired. The reason for ranking is to provide a priority display of the most attractive search result to the user. Such process is not necessary for the technical solution of the present disclosure. That is, the ranking may be not executed. Instead, the acquired personalized search result may be used as the personalized search result to be returned to the user directly.

If there is a large number of personalized search results acquired in the above search process, for example, millions of personalized search results or even more, in an overall consideration of subsequent processing performance, amount of data transmission and user's browsing habit, part of the search results may be selected according to certain strategies and displayed to the user. In an example where the search results are commodities, if no ranking processing is conducted, a certain number such as one hundred thousands of commodities with the highest sales volume may be selected according to the sales volume as the personalized search results to be returned to the user; if a ranking processing is conducted, top one hundred thousands of commodities may be selected as the personalized search results to be returned to the user.

It should be noted that the forgoing step of acquiring personalized search results may also be implemented by accessing the server that provides personalized search results. In this case, the operation includes two parts: sending a request and receiving a reply, or more specifically, sending a request for acquiring personalized search results to the server that provides personalized search results, the request including the query information and the user relationship data; and receiving personalized search results associated with the query information and the user relationship data and returned by the server.

At 110, a display order for various search result items in the first search result and the second search result is set according to a preset rule.

After operations from 104 to 108 are executed, a display order may be set for search result items in the acquired personalized search result (i.e., the second search result set forth in the present disclosure) and the first search result to acquire the final search result of the search request. If the first search result is ranked before the personalized search result, the personalized search result may not be viewed according to the user's browsing habits, and if the personalized search result is ranked before the first search result, it is possible to affect the user's browsing experience due to excessive personalization. However, setting a display order for both search results according to a preset rule to combine both search results effectively solves the above problem. For example, the display order may be set as follows: three first search result items are displayed firstly, and then two personalized search result items are displayed, and next three first search result items are displayed. That is, the first search result and the second search result are displayed alternately according to a preset rule.

In a specific implementation process, a display order number may be set for each search result item in both search results according to a preset rule, and the final mixed ranking operation may be completed by a device for organizing pages or displaying pages according to the display order number; or, in this step, both search results are mixed and ranked directly according to the preset rule. Both methods merely differ in specific implementations, and their combined search results are both visible to users.

In addition, in the process of setting a display order for search result items, some strategies may be added to guarantee abundant display effects. In an example where search result is commodity information, a finite number may be set for each seller or each relationship type. For example, each seller displays at most two commodities, and at most three commodities may be displayed for each relationship type. The strategy may be set or adjusted correspondingly according to specific implementation demand and application scenarios.

At 112, the first search result and the second search result are sent to the user after the display order is set.

At this point, the search results of the current search request, i.e., the first search result and the second search result after the display order is set, have been acquired. The search results are sent to the user, and the user browses desirable search results.

Before sending the search results to the user in this step, generally additional processing may be performed. For example, to-be-displayed texts or pictures of the search result items are annotated with the recommendation reason included in search result items, and the search results are mixed and ranked according to the set display order (if no mixed ranking operation is executed at 110), and the ranked search results are organized into webpages and the like and then sent to the user.

Certainly, in some example implementation processes, the search results acquired at 110 may be sent directly to a particular front-end device, and the front-end device, after implementing the above additional processing, sends them to the user.

As shown from the description of the foregoing example embodiments, the technical solution of the present disclosure acquires the first search result associated with the query information, acquires the second search result associated with both the query information and the user relationship data, combines both the first search result and the second search result according to a set strategy, and returns the combined search results to a user who initiates the search request, thereby providing abundant personalized search data to the user and meanwhile avoiding poor user experience caused by excessive personalization.

Figure 3:
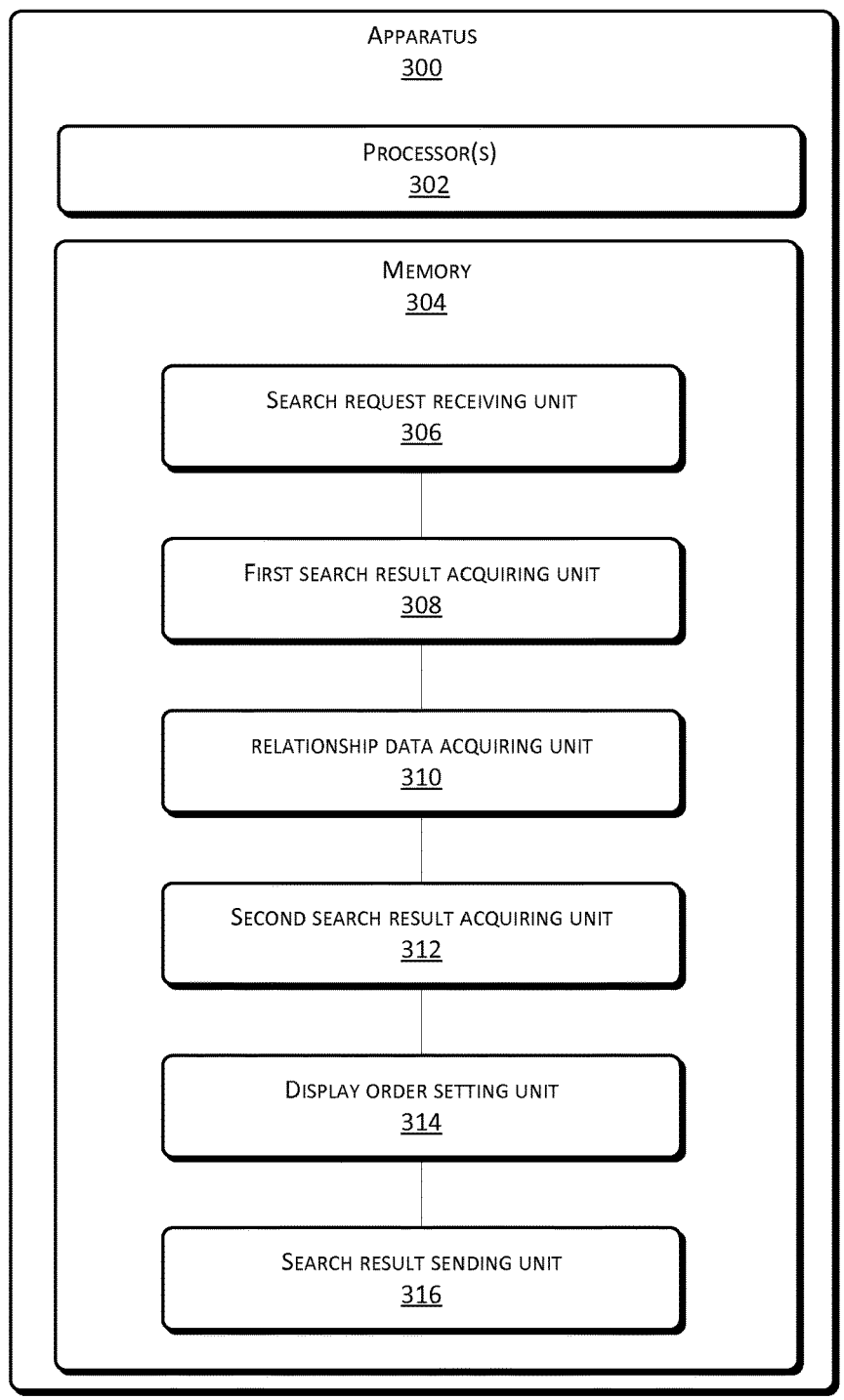
FIG. 3 is a schematic diagram of an example search apparatus for combining user relationship data according to the present disclosure.

The foregoing embodiments provide example search methods for combining user relationship data. Correspondingly, the present disclosure also provides an example search apparatus for combining user relationship data. FIG. 3 is a schematic diagram of an example search apparatus 300 for combining user relationship data according to the present disclosure. The apparatus embodiments are described simply because they are basically similar to the method embodiments. For the related part, references may be made to the description of the method embodiments. The following described apparatus embodiments are merely exemplary.

The search apparatus 300 for combining user relationship data provided in the example embodiment may include one or more processor(s) 302 or data processing unit(s) and memory 304. The memory 304 is an example of computer-readable media. The memory 304 may store therein a plurality of modules or units including the following units.

A search request receiving unit 306 receives a search request including user information and query information sent by a user. A first search result acquiring unit 308 conducts a search according to the query information to acquire a first search result associated with the query information. A relationship data acquiring unit 310 acquires user relationship data associated with the user information. A second search result acquiring unit 312 acquires a second search result associated with both the query information and the user relationship data. A display order setting unit 314 sets a display order for various search result items in the first search result and the second search result according to a preset rule. A search result sending unit 316 sends the first search result and the second search result to the user after the display order is set.

Optionally, the second search result acquiring unit 312 includes the following sub-units.

A search result acquisition sub-unit (not shown) conducts a search according to the query information and the user relationship data to acquire a second search result associated with both the query information and the user relationship data.

Alternatively, the second search result acquiring unit 312 may include a screening acquiring sub-unit (not shown) that screens search result items associated with the user relationship data from the first search result, and uses the screened search result items as the second search result.

Optionally, user information in the search request received by the search request receiving unit 306 includes user identification, or user identification and an IP address of a client terminal initiating the search request.

Optionally, the apparatus 300 may further include the following unit (not shown in FIG. 3).

A search request pre-processing unit pre-processes, such as conducting rewriting and/or word discard, query information included in the received search request to be more suitable for a search operation.

Optionally, the apparatus 300 may further include the following unit (not shown in FIG. 3).

A search category selecting unit selects a search category corresponding to the query information, before executing the operations of acquiring user relationship data, acquiring a first search result and acquiring a second search result.

Optionally, the relationship data acquiring unit 310 may include the following unit (not shown in FIG. 3).

A category selecting sub-unit selects a category of relationship data associated with the search category. An acquisition executing sub-unit acquires user relationship data according to the user information and the category of relationship data.

Optionally, the relationship data acquiring unit 310 may further include a data screening sub-unit (not shown in FIG. 3) that screens the acquired user relationship data according to the search category.

Optionally, when the second search result acquiring unit 312 includes the search result acquisition sub-unit, the search acquiring sub-unit searches data associated with the search category from an index database according to the query information and the user relationship data to acquire the second search result.

Optionally, the second search result acquiring unit 312 may further include a search result ranking sub-unit (not shown in FIG. 3) that scores each search result item in the acquired second search result according to a preset recommendation model, and ranks the second search result according to the scores from high to low.

Optionally, the second search result acquiring unit 312 may further include a recommendation reason annotating sub-unit (not shown in FIG. 3) that, for each search result item whose score meets a set requirement, writes into the search result item a relationship data category corresponding thereto as a recommendation reason for the search result item.

Optionally, the search result sending unit 316 may include the following units (not shown in FIG. 3).

A recommendation reason annotating sub-unit annotates to-be-displayed texts or pictures of a search result item including the recommendation reason in the second search result with the recommendation reason. A result sending executing sub-unit sends the first search result and the second search result to the user after the annotation.

Optionally, the first search result acquiring unit 308 may include the following units.

A first search request sending sub-unit sends a request for acquiring a first search result to a server that provides the first search result. The request includes the query information. A first search result receiving sub-unit receives the first search result associated with the query information and returned by the server.

Optionally, the relationship data acquiring unit 310 may include the following units (not shown in FIG. 3).

A data acquisition request sending sub-unit sends a request for acquiring user relationship data to a server that provides the user relationship data. The request includes at least the user information. A relationship data receiving sub-unit receives the user relationship data associated with the user information and returned by the server.

Optionally, the second search result acquiring unit 312 may include the following sub-units (not shown in FIG. 3).

A second search request sending sub-unit sends a request for acquiring a second search result to a server that provides the second search result. The request includes at least the user relationship data. A second search result receiving sub-unit receives the second search result associated with both the query information and the user relationship data and returned by the server.

Figure 4:
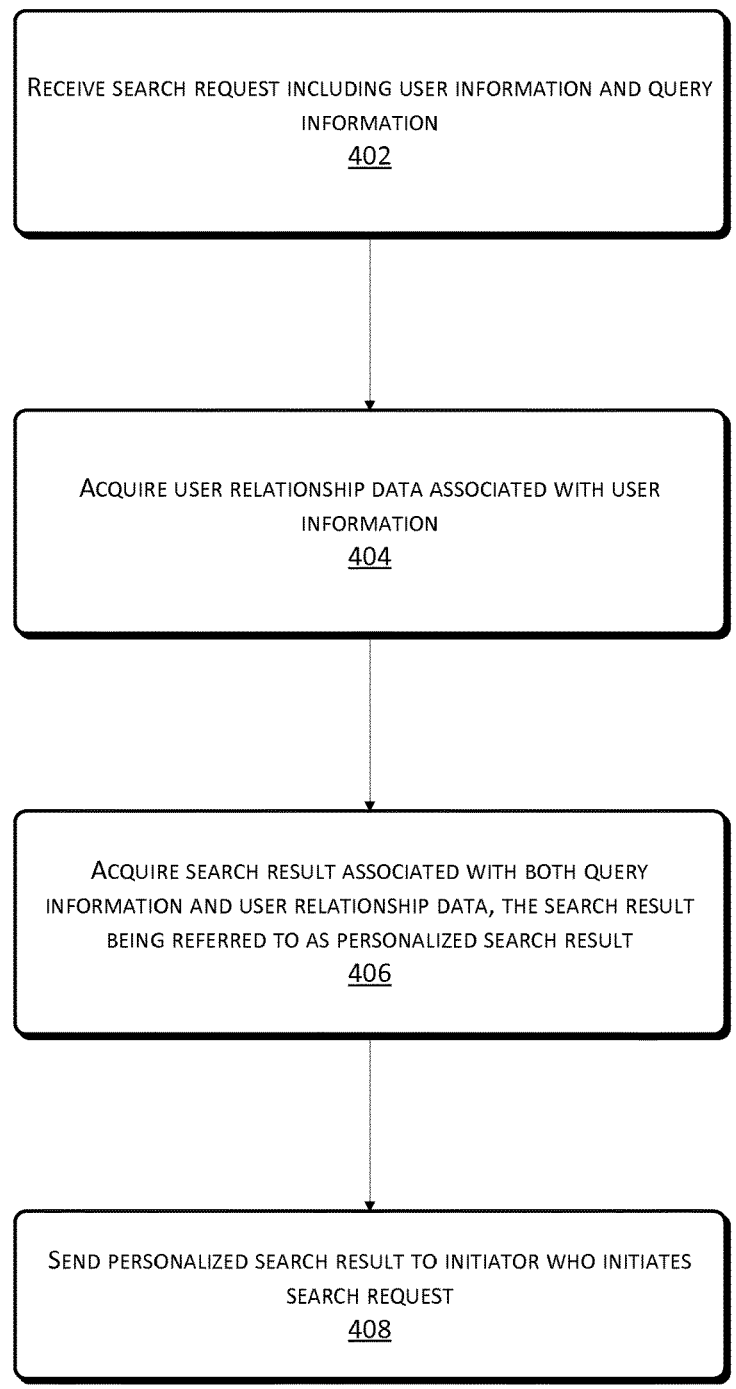
FIG. 4 is a flowchart of an example personalized search method based on user relationship data according to the present disclosure.

Corresponding to the foregoing search method for combining user relationship data, the present disclosure further provides a personalized search method based on user relationship data. Please refer to FIG. 4, which is a flowchart of an example personalized search method based on user relationship data according to the present disclosure. The portions of this example embodiment, which are identical with or similar to those of the first embodiment, will not be described, and their differences will be emphasized below. A personalized search method based on user relationship data, which is provided in the present disclosure, may include the following operations.

At 402, a search request including user information and query information is received.

For example, the user information may include user identification or, user identification and an IP address of a client terminal initiating the search request.

After receiving a search request, the query information may be pre-processed firstly. That is, the query information is rewritten to be more suitable for a search operation according to a preset rule. The rewriting operation may include replacing part of the characters or words in the query information and deleting unnecessary characters or words in the query information.

A search category corresponding to the query information may be selected before executing acquiring user relationship data at 404 and executing acquiring the personalized search result at 406.

At 404, user relationship data associated with the user information is acquired.

For example, this operation may include the following processing:

1) a category of relationship data associated with the search category is selected.

2) the user relationship data is acquired according to the user information and the category of the relationship data.

3) the acquired user relationship data is screened according to the search category.

If at 402 no search category corresponding to the query information is selected, at 404, it is unnecessary to execute the processing 1) and 3). Instead, processing 2) may be executed directly, and the technical solution of the present disclosure may still be achieved by acquiring user relationship data only according to the user information.

Accessing the server that provides user relationship data may also complete the forgoing operations of acquiring user relationship data. In this case, the operation includes two parts: sending a request and receiving a reply, or specifically, sending a request for acquiring user relationship data to the server that provides the user relationship data, the request including the user information, or the user information and the query information and receiving the user relationship data associated with the user information and returned by the server.

At 406, a search result associated with both the query information and the user relationship data is acquired. The result is referred to as a personalized search result.

This operation may be implemented in either of the following two methods.

Method I: the personalized search result is acquired on the basis of the acquired first search result, which may include the following operations:

1) a search is conducted according to the query information to acquire the first search result associated with the query information.

2) search result items associated with the user relationship data is screened from the first search result, and the screened search result items is used as the personalized search result.

Method II: the personalized search result is acquired directly by searching. That is, the personalized search result is acquired by searching data associated with the search category from an index database according to the query information and the user relationship data.

Each search result item in the acquired personalized search result is scored according to a preset recommendation model after acquiring the personalized search result, and the personalized search result is ranked according to the scores from high to low. Furthermore, for each search result item whose score meets a set requirement, a relationship data category corresponding to the search result item is written into the search result item as a recommendation reason for the search result item.

It should be noted that the forgoing operation of acquiring personalized search results may also be completed by accessing the server that provides personalized search results. In this case, the operation includes two parts: sending a request and receiving a reply, or specifically, sending a request for acquiring personalized search results to the server that provides personalized search results, the request including the query information and the user relationship data; and receiving personalized search results associated with both the query information and the user relationship data and returned by the server.

At 408, the personalized search result is sent to the initiator who initiates the search request.

Before the personalized search result is sent to the initiator who initiates the search request, to-be-displayed texts or pictures of a search result item including recommendation reason may be annotated firstly by the recommendation reason, and then the personalized search result is sent to the initiator who initiates the search request after the annotation.

As shown from the foregoing description, the personalized search method based on user relationship data provided in the present disclosure, by acquiring user relationship data and personalized search result associated with the user relationship data, provides more abundant personalized search result to the user who initiates a search request.

The foregoing embodiment provides a personalized search method based on user relationship data. Correspondingly, the present disclosure further provides an example personalized search apparatus based on user relationship data. Please refer to FIG. 5, which is a schematic diagram of an example personalized search apparatus based on user relationship data according to the present disclosure. The apparatus embodiments are described simply as they are basically similar to the method embodiments. Relevant portions may refer to the description of the method embodiments. The apparatus embodiments described below are merely exemplary.

The present disclosure provides an example personalized search apparatus 500 based on user relationship data, which may include one or more processor(s) 502 or data processing unit(s) and memory 504. The memory 504 is an example of computer-readable media. The memory 504 may store therein a plurality of modules or units including the following units.

A personalized search request receiving unit 506 receives a search request including user information and query information. A personalized relationship data acquiring unit 508 acquires user relationship data associated with the user information. A personalized search result acquiring unit 510 acquires a search result associated with both the query information and the user relationship data, which is referred to as personalized search result. A personalized search result sending unit 512 sends the personalized search result to the initiator who initiates the search request.

Figure 5:
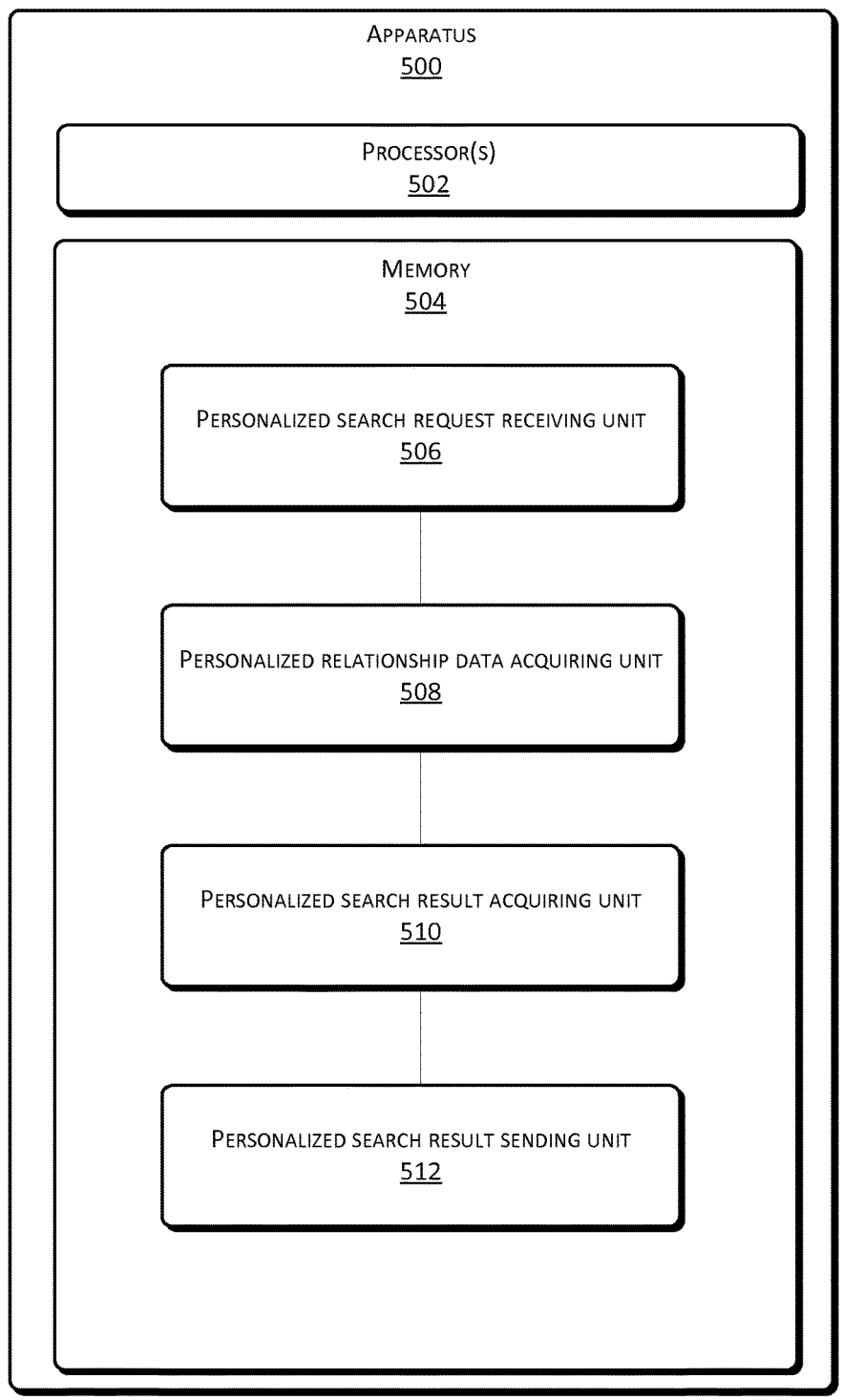
FIG. 5 is a schematic diagram of an example personalized search apparatus based on user relationship data according to the present disclosure.

Optionally, the personalized search result acquiring unit 510 may include the following sub-units (not shown in FIG. 5).

A first search result acquisition sub-unit conducts a search according to the query information to acquire a first search result associated with the query information. A search result screening sub-unit screens search result items associated with the user relationship data from the first search result, and use the screened search result items as the personalized search result.

Optionally, the personalized search result acquiring unit 510 may include a personalized search executing sub-unit (not shown in FIG. 5) that conducts a search according to the query information and the user relationship data to acquire a personalized search result associated with both the query information and the user relationship data.

Optionally, user information in a search request received by the personalized search request receiving unit 506 includes user identification, or user identification and an IP address of a client terminal initiating the search request.

Optionally, the apparatus 500 may further include a search request pre-processing unit (not shown in FIG. 5) that pre-processes, such as rewriting and/or word discarding, query information included in the received search request to be more suitable for a search operation.

Optionally, the apparatus 500 may further include a search category selecting unit (not shown in FIG. 5) that selects a search category corresponding to the query information before executing the operations of acquiring user relationship data and acquiring a personalized search result.

Optionally, the personalized relationship data acquiring unit 508 may include the following units (not shown in FIG. 5).

A category selecting sub-unit selects a category of relationship data associated with the search category. An acquisition executing sub-unit acquires user relationship data according to the user information and the category of relationship data.

Optionally, the personalized relationship data acquiring unit 508 may further include a data screening sub-unit (not shown in FIG. 5) that screens the acquired user relationship data according to the search category.

Optionally, when the personalized search result acquiring unit 510 includes the personalized search executing sub-unit, the personalized search executing sub-unit searches data associated with the search category from an index database according to the query information and the user relationship data to acquire the personalized search result.

Optionally, the personalized search result acquiring unit 510 may further include a search result ranking sub-unit (not shown in FIG. 5) that scores each search result item in the acquired personalized search result according to a preset recommendation model, and ranks the personalized search result according to the scores from high to low.

Optionally, the personalized search result acquiring unit 510 may further include a recommendation reason recording sub-unit (not shown in FIG. 5) that, with respect to each search result item whose score meets a set requirement, writes in the search result item a relationship data category corresponding thereto as a recommendation reason for the search result item.

Optionally, the personalized search result sending unit 512 may include the following sub-units (not shown in FIG. 5).

A recommendation reason annotating sub-unit annotates to-be-displayed texts or pictures of the search result item including the recommendation reason with the recommendation reason. A personalized search result sending executing unit sends the personalized search result to the initiator who initiates the search request after the annotation.

Optionally, the personalized relationship data acquiring unit 508 may include the following sub-units (not shown in FIG. 5).

A data acquisition request sending sub-unit sends a request for acquiring user relationship data to a server that provides the user relationship data. The request includes at least the user information. A relationship data receiving sub-unit receives the user relationship data associated with the user information and returned by the server.

Optionally, the personalized search result acquiring unit 510 includes the following sub-units (not shown in FIG. 5).

A personalized search request sending sub-unit sends a request for acquiring a personalized search result to a server that provides the personalized search result. The request includes the query information and the user relationship data. A personalized search result receiving sub-unit receives the personalized search result associated with both the query information and the user relationship data and returned by the server.

Figure 6:
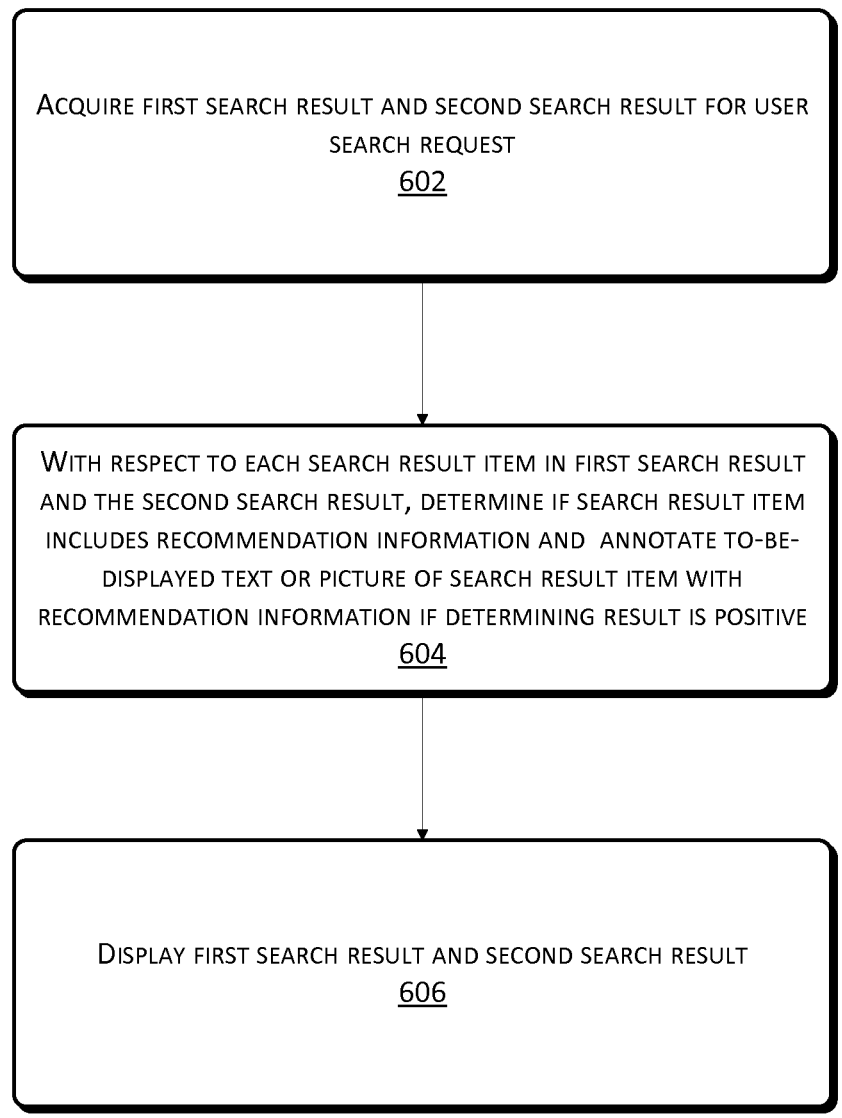
FIG. 6 is a flowchart of an example method for displaying search results according to the present disclosure.

In addition, the present disclosure further provides an example method for displaying search results. FIG. 6 is a flowchart of an example method for displaying search results according to the present disclosure. The portions of this example embodiment that are identical with or similar to those of the previous example embodiments will not be described, and this example embodiment emphasizes differences from the previous example embodiments.

The present disclosure provides an example method for displaying search results as at present information provided by a search engine is returned by the engine after scoring and ranking based on various factors, and the authority and validity of the information are determined by algorithms in the background of the engine, which is a black box to users. In a front-end search result page, the user may only see inflexible information display, and there is no other information assisting the user in judgment. Therefore, the user is unable to acquire the relation between the current search results and himself/herself, i.e., unable to perceive the personalized result, which leads to a consequence that the user still needs to compare and judge the credibility and accuracy of the results when selecting desirable information, thereby increasing the cost of information screening.

In the method for displaying search results provided in the present disclosure, in order to enable a user to perceive a personalized search result, to-be-displayed texts or pictures of a personalized search result item are annotated with the recommendation information corresponding to the search result, and the personalized search result is then displayed to the user.

As shown in FIG. 6, an example method for displaying personalized search result provided in the present disclosure may include the following operations.

At 602, a first search result and a second search result for a user search request are acquired. The first search result is a search result associated with query information included in the search request. The second search result is a personalized search result associated with both user personal information and query information included in the search request.

The second search result acquired in this operation is the personalized search result associated with both user personal information and query information included in the search request. The user personal information may be either general information regarding age, gender, hobby, or other normal information of the user, or user relationship data.

At 604, with respect to each search result item in the first search result and the second search result, the techniques of the present disclosure determine if the search result item includes recommendation information. If a determining result is positive, a to-be-displayed text or picture of the search result item is annotated with the recommendation information.

The techniques of the present disclosure determine, for each search result item in the acquired first search result and the second search result, if the search result item includes recommendation information. If a determining result is positive, the to-be-displayed texts or pictures of the search result item are annotated with the recommendation information. If the first search result and the second search result may be distinguished in the acquired search results, for example, this operation may be only applicable to the second search result to execute the above determination and annotation operation.

For example, the recommendation information in this operation may be recommendation reason. By using the search of commodities as an example, the recommendation reason may be a commodity purchased, a commodity browsed, etc. The recommendation information is not limited to the recommendation reason, and may also include other more abundant information, such as a degree of correlation between search result items and the user, etc. Such information may help users perceive the degree of correlation between the personalized search result and themselves, and thus help the users make a quick and correct decision.

The annotation operation may have multiple methods for specific implementation. If to-be-displayed information of a search result item is merely text, the recommendation information may be written in an appropriate position of the text and may be written in a different color or font. For example, the recommendation may be inserted behind a header field, and brackets may be added for differentiation. If to-be-displayed information of a search result item includes a picture, the recommendation information may be superposed in an appropriate position of the picture, for example, the upper left corner of the picture or the background image region. The above annotation methods are merely exemplary, and in different implementations, other methods different from the above annotation method be used as long as the user may conveniently acquire the recommendation information when the search results are displayed.

At 606, the first search result and the second search result are displayed.

If operations at 602 and 604 are executed on a client terminal device which initiates a search request, i.e., two types of search results are received on the client terminal device and recommendation information is annotated, this operation may only need to directly display the first search result and the second search result. If the operations at 602 and 604 are not executed on the client terminal device, which are, for example, executed on a front-end device of the search system, this operation needs to send the first search result and the second search result to a client terminal of the initiator who initiates the search request for display after the annotation.

Figure 7:
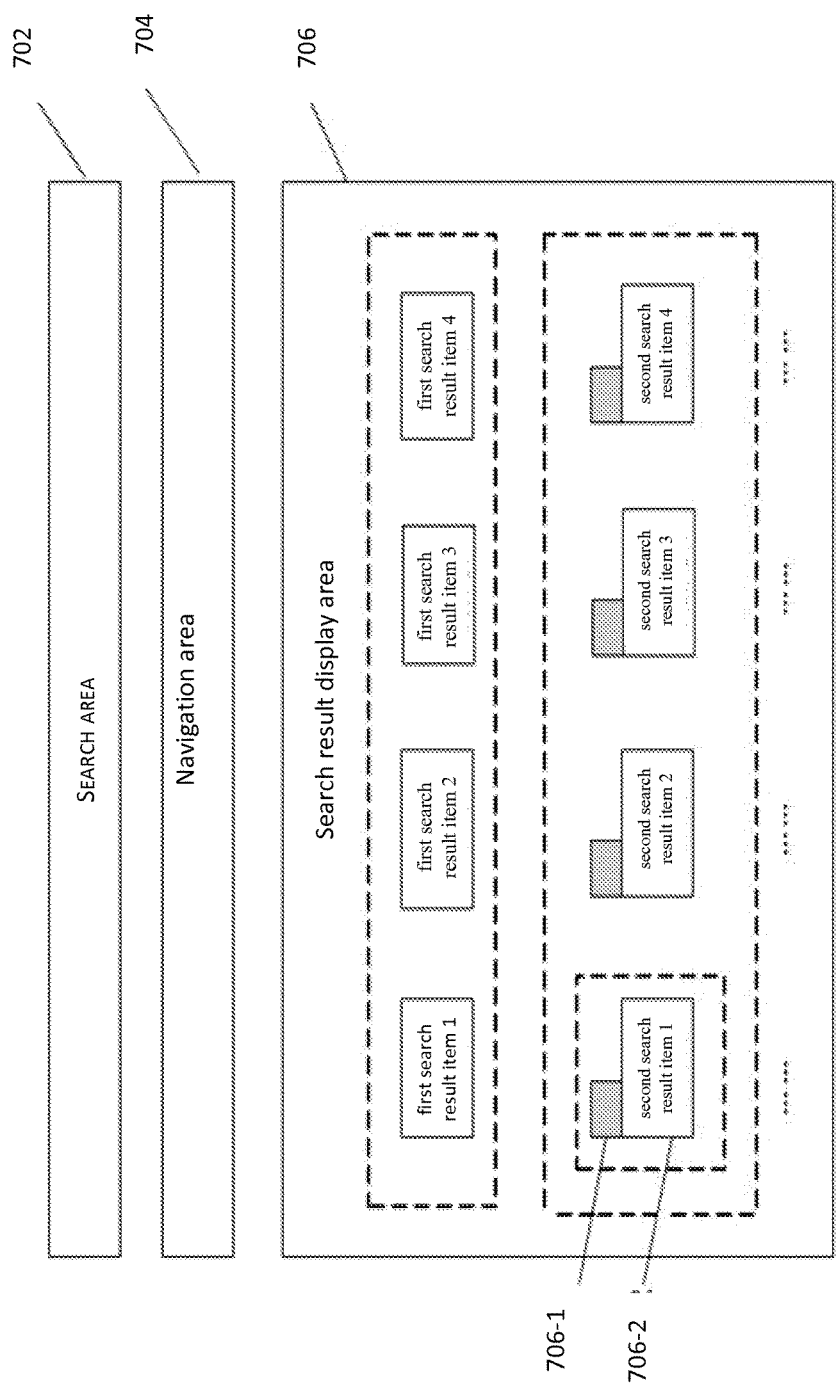
FIG. 7 is an effect diagram of an example method for displaying search results according to the present disclosure.

Please refer to FIG. 7, which is a schematic diagram of implementation effect of an example method for displaying search results according to the present disclosure. The page shown in this FIG includes a search area 702, a navigation area 704, and a search result display area 706. A first line of the search result display area 706 displays 4 first search result items, and a second line displays 4 second search result items (i.e., personalized search result items). The display area of each of the second search result items includes two parts. By using the second search result item 1 as an example, the display area of the second search result item includes a recommendation information display area 706-1 represented by a gray block and a result display area 706-2. The result display area 706-2 displays the specific content of the search result item in the form of text or picture. The recommendation information display area 706-1 displays the recommendation reason for the search result item, for example, "a commodity purchased," "a commodity browsed," etc.

The method for displaying search results provided in the present disclosure, by annotating to-be-displayed texts or pictures of a personalized search result item with recommendation information corresponding to the search result and by displaying the personalized search result to a user, enables the user to clearly perceive the source of the search result, thereby reducing the cost of information screening for the user and assisting the user in making a quick and correct decision.

Figure 8:
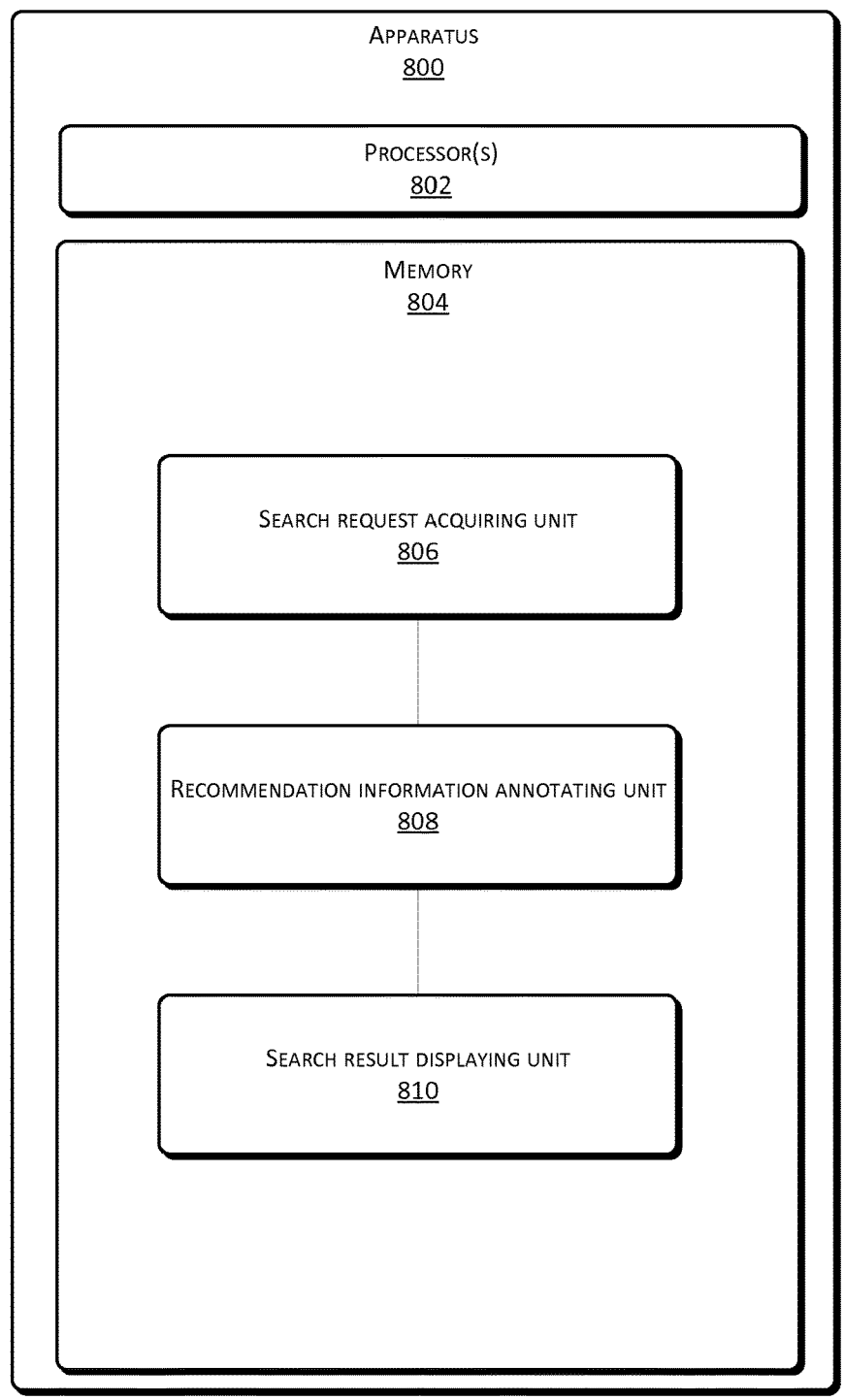
FIG. 8 is a schematic diagram of an example apparatus for displaying search results according to the present disclosure.

The foregoing example embodiment provides an example method for displaying search results. Correspondingly, the present disclosure further provides an example apparatus 800 for displaying search results. FIG. 8 is a schematic diagram of an example apparatus 800 or displaying search results according to the present disclosure. The apparatus embodiments are described simply as they are basically similar to the method embodiments. Relevant portions may refer to the description of the method embodiments. The apparatus embodiments described below are merely exemplary.

The present disclosure provides an example apparatus 800 for displaying search results, which may include one or more processor(s) 802 or data processing unit(s) and memory 804. The memory 804 is an example of computer-readable media. The memory 804 may store therein a plurality of modules or units including the following units.

A search result acquiring unit 806 acquires a first search result and a second search result for a user search request. The first search result is a search result associated with query information included in the search request. The second search result is a personalized search result associated with both user personal information and query information included in the search request. A recommendation information annotating unit 808 determines, for each search result item in the first search result and the second search result, if the search result item includes recommendation information; and if so, annotates to-be-displayed texts or pictures of the search result item with the recommendation information. A search result displaying unit 810 displays the first search result and the second search result.

Optionally, the second search result acquired by the search result acquiring unit 806 is the personalized search result associated with both user relationship data and query information included in the search request.

Optionally, the recommendation information annotated by the recommendation annotating unit 808 includes recommendation reason and/or degree of association with the user.

Optionally, the search result displaying unit 810 sends the first search result and the second search result to the client terminal of the initiator who initiates the search request for display.

Figure 9:
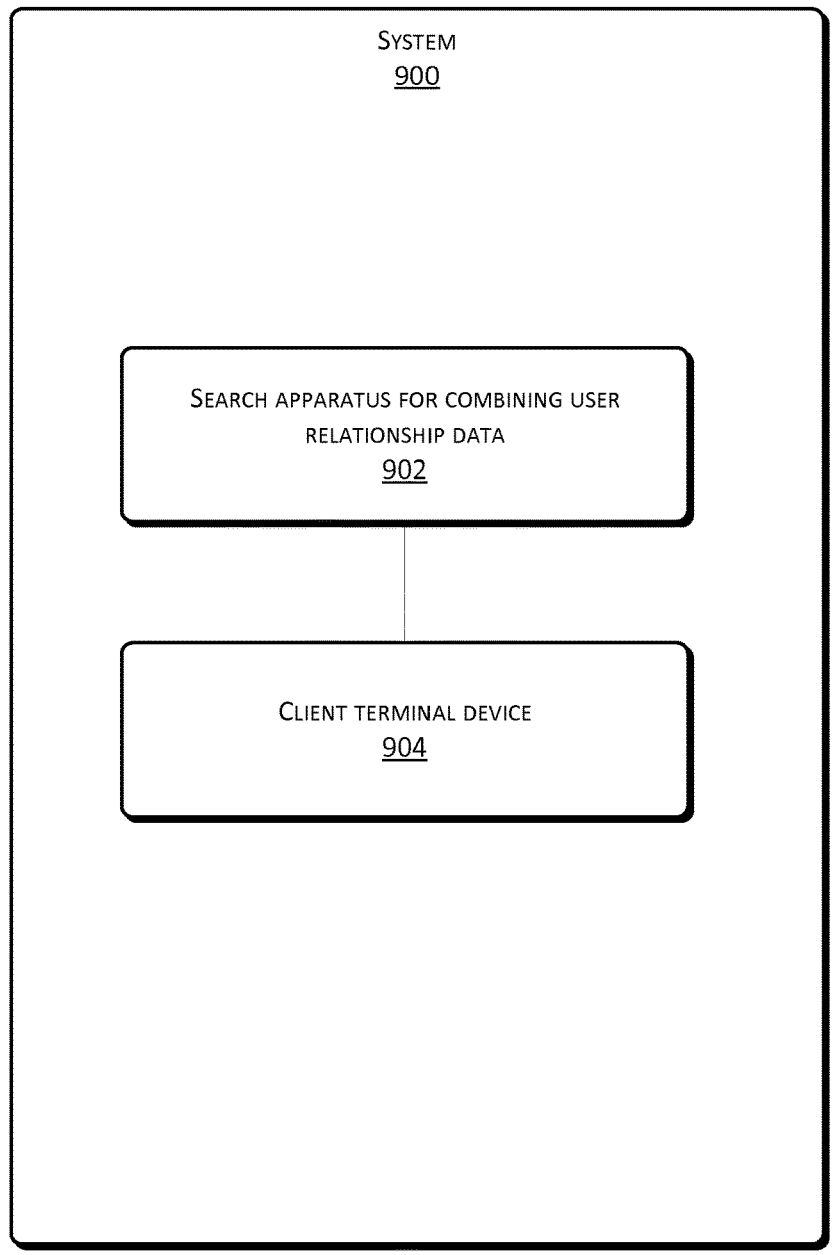
FIG. 9 is a schematic diagram of an example search system for combining user relationship data according to the present disclosure.

The present disclosure further provides an example search system for combining user relationship data. As shown in FIG. 9, the system 900 includes a search apparatus for combining user relationship data 902 as mentioned in the foregoing example embodiments and a client terminal device 904 that sends a user search request. The client terminal device 904 may be deployed in multiple types of terminal devices, such as mobile communication device, personal computer, PAD, iPad and the like, to send a user search request. The search apparatus 902 for combining user relationship data is generally deployed in the server, but is not limited thereto and may include any device capable of implementing the search method for combining user relationship data according to the present disclosure.

For example, the client terminal device 904 send a user search request is a personal computer, and the search apparatus 902 for combining user relationship data is deployed in a search engine server. The user inputs query information in the search interface of the personal computer, and the personal computer sends a search request including user information and query information. After receiving the search request, the search engine server executes the operations of acquiring the user relationship data, acquiring the first search result, acquiring the second search result associated with the user relationship data, and mixing and ranking both search results, and then sending the search results to the personal computer. In this way, the user views the desirable search results of combining personalized search data.

In the specific implementation process, the search apparatus for combining user relationship data 902 may also be deployed on a plurality of servers or devices. In other words, the functions of the search apparatus 902 may be jointly achieved by a plurality of servers or devices. For example, the search apparatus for combining user relationship data 902 is deployed on a front-end device, a search control device, a category selection device, a relationship data acquisition device, a first search result acquisition device, and a second search result acquisition device. The front-end equipment receives a search request from the client terminal device and then send the request to the search control device. The search control device acquires a search category from the category selection device, acquires user relationship data from the relationship data acquisition device, acquires the first search result from the first search result acquisition device, acquires the second search result associated with the user relationship data from the second search result acquisition device, and then mixes and ranks both search results and sends the search results to the front-end device, which organizes search results into a page and finally sends the page to the client terminal device 904 for display.

Above examples are merely exemplary, and in other implementations, different deployment modes can be adopted, which all belong to the scope of protection of the present disclosure as long as they can implement the overall function of the search system for combining user relationship data of the present disclosure.

Although the example embodiments of the present disclosure are disclosed as above, they are not intended to limit the present disclosure. Persons skilled in the art may make possible modifications and variations without departing from the spirit and principle of the present disclosure, and thus the protection scope of the present disclosure shall be subject to the scope as defined in the claims of the present disclosure.

In a standard configuration, a computing device, such as the server, apparatus, system, or the client terminal device, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

What is claimed is:

1. A method comprising:
   receiving an online search request including user information of a user and query information;
   improving search efficiency of a personalized search by narrowing a search scope including:
   selecting a search category corresponding to the query information;

conducting a search according to the query information to acquire a first search result associated with the query information;

selecting a category of relationship data associated with the search category;

acquiring user relationship data according to the user information and the category of relationship data, the user relationship data including social relationship data of the user; and acquiring a second search result by conducting another search according to the query information and the user relationship data; and combining the first search result and the second search result as a personalized search result including:

setting a display order for displaying various search result items in the first search result and the second search result according to a preset rule;

sending the first search result and the second search result for display after the display order is set; and displaying the first search result and the second search result in the display order.

2. The method of claim 1, wherein the acquiring the second search result comprises:

conducting a search according to the query information and the user relationship data to acquire the second search result associated with the query information and the user relationship data.

3. The method of claim 1, wherein the acquiring the second search result comprises:

screening search result items associated with the user relationship data from the first search result; and using the screened search result items as the second search result.

4. The method of claim 1, wherein the user information includes:

a user identification of the user that initiates the search request; or an IP address associated with a client terminal that sends the search request.

5. The method of claim 1, wherein the setting the display order comprises alternatively displaying various search result items in the first search result and the second search result.

6. The method of claim 1, further comprising rewriting the query information according to the preset rule after receiving the search request.

7. The method of claim 1, wherein the acquiring the user relationship data comprises screening acquired user relationship data according to the search category.

8. The method of claim 1, wherein the acquiring the second search result comprises searching data associated with a search category from an index database according to the query information and the user relationship data to acquire the second search result.

9. The method of claim 1, wherein the acquiring the second search result comprises:

scoring multiple search result item in the second search result according to a preset recommendation model; and ranking the multiple search result items in the second search result according to scores from high to low.

10. The method of claim 1, wherein the acquiring the second search result comprises:

writing a recommendation reason into a respective search result item of the second search result.

11. The method of claim 10, wherein the recommendation reason includes a relationship data category corresponding to the respective search result item.

12. The method of claim 1, wherein the sending the first search result and the second search result to the user for display comprises:

annotating a to-be-displayed text or picture of a respective search result item in the second search result with a recommendation reason for the respective search result item.

13. An apparatus comprising:

one or more processors; and memory communicatively coupled to the one or more processors, the memory comprising a plurality of units communicatively coupled to each other, the plurality of units for improving search efficiency of a personalized search by narrowing a search scope, the plurality of units comprising:

a search request receiving unit that receives an online search request including user information a user and query information;

a search category selecting unit that selects a search category corresponding to the query information;

a first search result acquiring unit that conduct a search according to the query information to acquire a first search result associated with the query information;

a relationship data acquiring unit that acquires user relationship data associated with the user information, the user relationship data including social relationship data of the user, the relationship data acquiring unit comprising:

a category selecting sub-unit that selects a category of relationship data associated with the search category, and an acquisition executing sub-unit that acquires the user relationship data according to the user information and the category of relationship data;

a second search result acquiring unit that acquire a second search result by conducting another search according to the query information and the user relationship data;

a display order setting unit that combines the first search result and the second search result as a personalized search results including setting a display order for various search result items in the first search result and the second search result according to a preset rule; and a search result sending unit that sends the first search result and the second search result to the user for display after the display order is set.

14. The apparatus of claim 13, wherein the second search result acquiring unit comprises:

a recommendation reason annotating sub-unit that:

determines a respective search result item whose score meets a set requirement; and writes into the respective search result item a relationship data category corresponding to the respective search result item as a recommendation reason for the respective search result item.

15. The apparatus of claim 13, wherein the search result sending unit comprises:

a recommendation reason annotating sub-unit that annotates a to-be-displayed text or picture of a respective search result item in the second search result with a recommendation reason for the respective search result item.

16. The apparatus of claim 13, wherein the second search result acquiring unit further comprises a screening acquiring sub-unit that screens search result items associated with the user relationship data from the first search result and uses the screened search result items as the second search result.

17. The apparatus of claim 13, wherein the user information includes:
- a user identification, or
- an IP address of a client terminal initiating the search request.

18. A method comprising:
- in response to receiving an online search request that includes query information and user information, improving search efficiency of a personalized search by narrowing a search scope including:
  - selecting a search category corresponding to the query information, and
  - acquiring a first search result and a second search result, the first search result being a search result associated with the selected search category, the second search result being a personalized search result from a search conducted according to the user information and a category of relationship data, the user information including social relationship data of a user, the category of relationship data associated with the selected search category; and
- writing a recommendation reason into a respective search result item of the first search result and the second search result.

19. The method of claim 18, wherein the recommendation reason includes a relationship data category corresponding to the respective search result item.

20. The method of claim 18, further comprising
- annotating a to-be-displayed text or picture of the respective search result item with a recommendation reason for the respective search result item; and
- displaying the respective search result item after the annotating.

* * * * *